United States Patent [19]
Mlejnek et al.

[11] Patent Number: 6,076,419
[45] Date of Patent: Jun. 20, 2000

[54] GEAR ARRANGEMENT

[75] Inventors: Daniel George Mlejnek, Lexington; Harald Portig, Versailles; Richard Andrew Seman, Jr., Lexington, all of Ky.

[73] Assignee: Lexmark International, Inc., Lexington, Ky.

[21] Appl. No.: 09/236,840

[22] Filed: Jan. 25, 1999

[51] Int. Cl.[7] .............................. F16H 1/20; F16H 57/02; F16C 33/02

[52] U.S. Cl. ............... 74/421 R; 74/606 R; 74/DIG. 10; 384/276

[58] Field of Search .............................. 74/421 R, 421 A, 74/DIG. 10, 606 R; 384/276, 416

[56] References Cited

U.S. PATENT DOCUMENTS

| | | | |
|---|---|---|---|
| 4,758,202 | 7/1988 | Maciag et al. | 384/276 X |
| 5,046,377 | 9/1991 | Wilkes et al. | 74/421 R X |
| 5,746,092 | 5/1998 | Baba | 74/421 R |
| 5,799,548 | 9/1998 | Brooks et al. | 74/606 R |

*Primary Examiner*—Allan D. Herrmann
*Attorney, Agent, or Firm*—John A. Brady

[57] ABSTRACT

A plastic gear is rotatably supported on at least one plastic fixed support stud, which is preferably formed of plastic and molded on a metal support plate. The fixed support stud has three equiangularly spaced lobes extending from its outer surface without any nominal clearance with an inner surface of a hub of a plastic gear defining a bore in the gear hub to receive the fixed support stud. The lobes cause deformation of portions of the gear hub between the adjacent lobes. By increasing the clearance between the outer surface of the fixed support stud and the inner surface of the gear hub, spaces are provided between the adjacent lobes to allow portions of the inner surface of the gear hub to extend thereinto due to the deformation of the plastic. This reduces the vibration or jitter of the plastic gear, which is the output gear of a gear train for driving a photoconductive drum of a laser printer to improve its print quality.

20 Claims, 7 Drawing Sheets

GEAR ARRANGEMENT

FIELD OF THE INVENTION

This invention relates to a gear arrangement and, more particularly, to a gear rotatably supported on at least one fixed support stud with a hub of the gear having no nominal clearance between its inner surface, which defines the bore in the hub receiving the fixed support stud, and the circumference of the maximum effective diameter of the fixed support stud.

BACKGROUND OF THE INVENTION

U.S. Pat. No. 5,799,548 to Brooks et al discloses two substantially parallel metal support plates having plastic gears rotatably supported therebetween. Each of the plastic gears is rotatably supported by its hub on two plastic fixed support studs with each extending from one of the two support plates.

A nominal clearance is provided between the outer surface of each of the two fixed support studs and the inner surface of the gear hub. As the nominal clearance between the outer surface of each of the two fixed support studs and the inner surface of the gear hub increases, the plastic gear is subjected to increased vibration or jitter (imprecise and wavering rotation). When the plastic gear is the output gear of a gear train connected to an input gear of a photoconductive drum of a laser printer for rotating the drum, this vibration or jitter creates vibrations in the drum to affect the print quality of the laser printer.

If the nominal clearance between the outer surface of each of the two fixed support studs and the inner surface of the gear hub is reduced towards zero to decrease the vibration or jitter and improve the print quality, binding of the gear hub on each of the two fixed support studs may occur. This is because the tolerances of the gear hub and each of the two fixed support studs can exceed the nominal clearance.

This binding of the gear hub on one or both of the two fixed support studs would increase the torque required to rotate the gear hub on the two fixed support studs. In addition to requiring an increase in the torque with a decrease in the nominal clearance between the inner surface of the gear hub and the circumference of the fixed support studs, binding also causes excessive wear of the gear hub and the two fixed support studs. Binding also could cause seizing. Therefore, reducing the nominal clearance between the inner surface of the gear hub and the outer surface of each of the two fixed support studs by increasing the diameter of each of the two fixed support studs, for example, is not a solution to reducing jitter or vibration of the plastic gear so as to improve print quality of a laser printer having its photoconductive drum driven by a gear train.

SUMMARY OF THE INVENTION

The gear arrangement of the present invention satisfactorily solves the foregoing problem of reducing jitter or vibration of the plastic gear without having binding of the gear hub on the fixed support studs on which the hub is rotatably supported. The gear arrangement of the present invention avoids a significant increase in torque or significant excessive wear.

This is accomplished by forming at least three angularly spaced lobes, which are preferably equiangularly spaced, on the circumference of each of the fixed plastic support studs on which a plastic gear is rotatably mounted. The three lobes create an effective diameter of each of the fixed support studs slightly less than, equal to, or slightly greater than the diameter of the bore of the gear hub.

It should be understood that the nominal clearance is designed to be zero between the circumference of each of the fixed support studs and the inner surface of the gear hub. However, because of the tolerances in manufacturing the plastic gear and each of the fixed support studs, the effective clearance may result in the lobes engaging the inner surface of the gear hub or being spaced slightly therefrom.

The engagement of each of the three lobes with the inner surface of the gear hub causes deformation of the plastic between the lobes. This deformation causes protrusion of the inner surface of the gear hub into spaces between the lobes. These protrusions can occur because the diameter of the arcuate portions of each of the fixed support studs between the lobes is sufficiently smaller than the diameter of the inner surface of the gear hub.

An object of this invention is to reduce gear jitter or vibration in a plastic gear.

Another object of this invention is to reduce gear jitter or vibration in a plastic gear functioning as an output gear of a gear train.

A further object of this invention is to reduce gear jitter or vibration in a plastic gear functioning as an output gear of a gear train used in a printer controlled by a personal computer.

Other objects of this invention will be readily perceived from the following description, claims, and drawings.

BRIEF DESCRIPTION OF THE DRAWINGS

The attached drawings illustrate a preferred embodiment of the invention, in which.

DETAILED DESCRIPTION OF PREFERRED EMBODIMENTS

Figure 1:
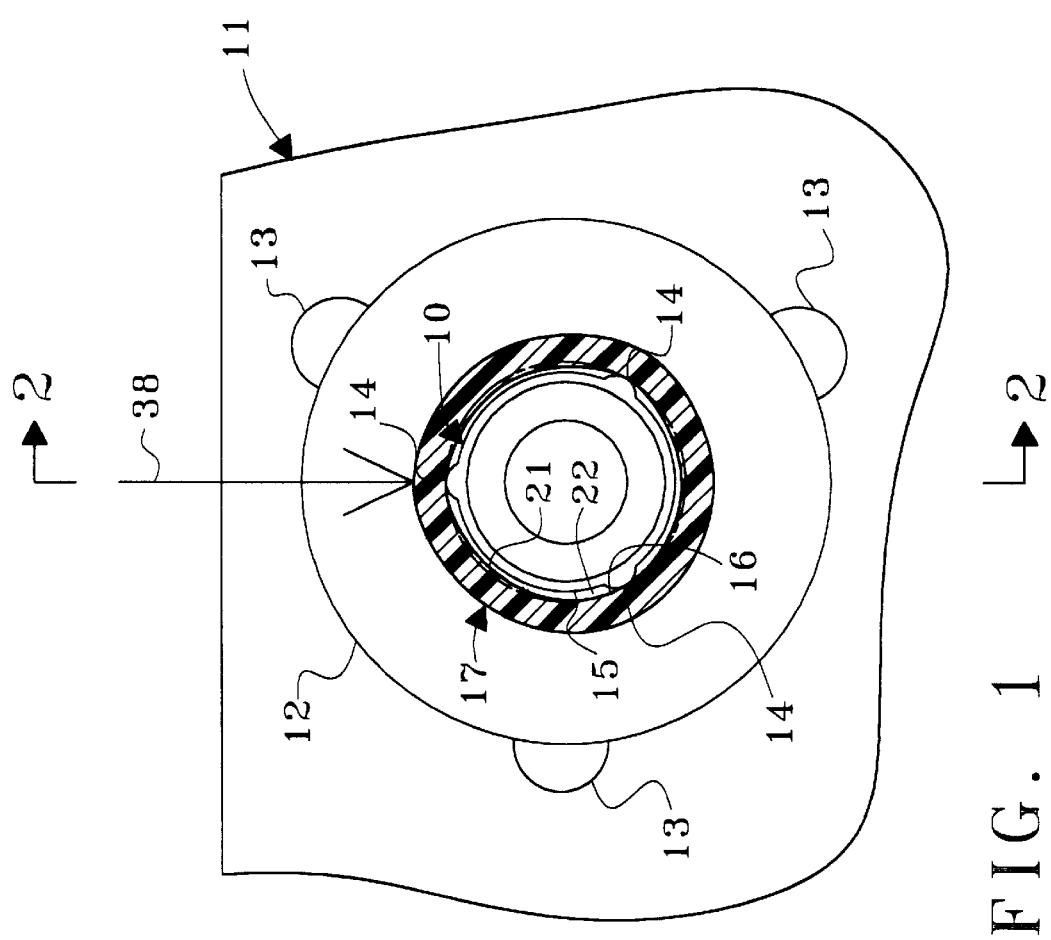
FIG. 1 is an end elevation view, partly in section, of one of two fixed support studs and a hub of a plastic gear rotatably supported on the one fixed support stud with the one fixed support stud having three lobes for engaging an inner surface of the gear hub to cause deformation of the gear hub with the deformation exaggerated for clarity purposes and taken along line 1—1 of FIG. 2.

Referring to the drawings and particularly FIG. 1, there is shown a first fixed support stud 10, which is preferably formed of a plastic and molded to a metal support plate 11 in the manner more particularly shown and described in the aforesaid Brooks et al patent. The fixed support stud 10 includes a base 12 molded to the metal support plate 11 and anchored thereto by anchors 13.

The fixed support stud 10 has at least three lobes 14 extending from its outer surface 15. The lobes 14 are preferably equiangularly spaced from each other.

Each of the lobes 14 engages inner surface 16 of a hub 17 of a plastic gear 18 (see FIG. 2) having teeth 19 around at least a portion of its periphery. Thus, a bore 20, which extends through the gear hub 17, is defined by the inner surface 16 of the gear hub 17.

It should be understood that it is not necessary for the three lobes 14 to be equiangularly spaced from each other. The only requirement is that engagement of the three lobes 14 with the inner surface 16 of the plastic gear 18 form a triangle with the center of rotation of the plastic gear 18 therein.

As shown in FIG. 1, the lobes 14 create deformation of the gear hub 17 between the adjacent lobes 14. It should be understood that the deformation of the gear hub 17 is exaggerated for clarity purposes.

Accordingly, portions 21 of the gear hub 17 extend into portions of three spaces 22 between the outer surface 15 of the fixed support stud 10 and the inner surface 16 of the gear hub 17. The outer surface 15 of the fixed support stud 10 is formed with a relatively large clearance from the inner surface 16 of the gear hub 17 to provide the three spaces 22. Each of the three spaces 22 extends between the adjacent lobes 14.

Figure 2:
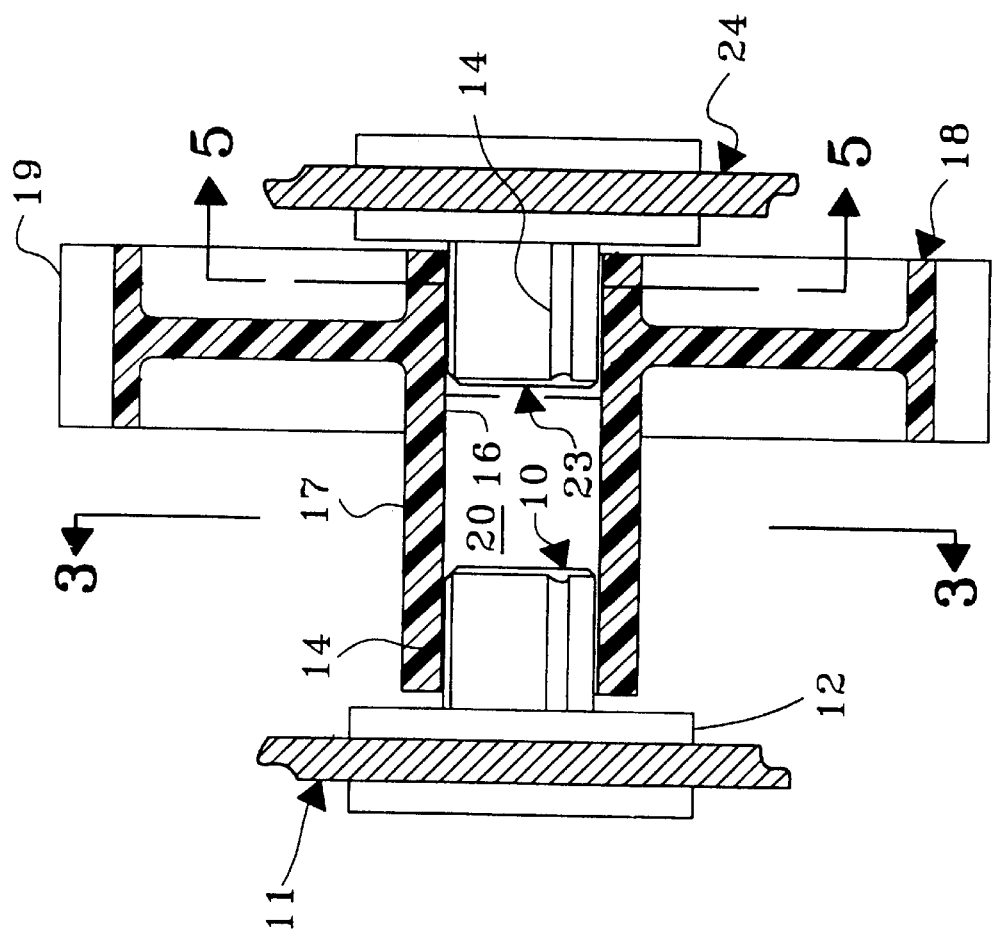
FIG. 2 is a sectional view, partly in elevation, of the two fixed support studs and the plastic gear of FIGS. 1 and 5 with the plastic gear hub rotatably supported on the two fixed support studs mounted on two metal support plates and taken along line 2—2 of FIG. 1.

As shown in FIG. 2, a second fixed support stud 23 is disposed in the opposite end of the bore 20 of the gear hub 17 from the end receiving the first fixed support stud 10. The second fixed support stud 23 is mounted on a second metal support plate 24 in the manner shown and described in the aforesaid Brooks et al patent.

Figure 5:
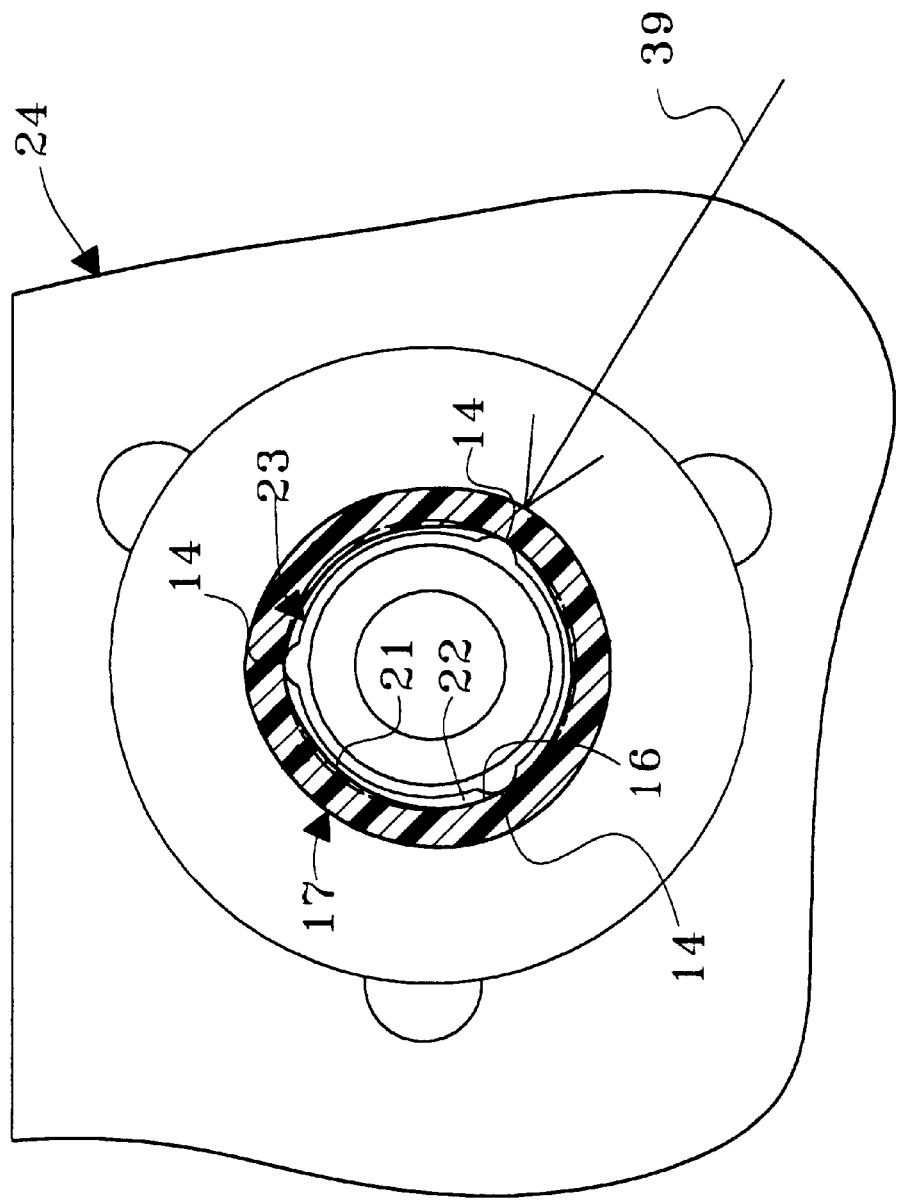
FIG. 5 is an end elevation view, partly in section, of the other of the two fixed support studs and the hub of the plastic gear rotatably supported on the other fixed support stud with the other fixed support stud having three lobes for engaging an inner surface of the gear hub to cause deformation of the gear hub with the deformation exaggerated for clarity purposes and taken along line 5—5 of FIG. 2.

As shown in FIG. 5, the second fixed support stud 23 has the lobes 14 in the same position as shown in FIG. 1 for the first fixed support stud 10. Each of the lobes 14 extends for the length of each of the first fixed support stud 10 and the second fixed support stud 23 (see FIG. 2).

It should be understood that the gear reaction force of the plastic gear 18 on each of the first fixed support stud 10 and the second fixed support stud 23 determines the angular position of the lobes 14 thereon. That is, the lobes 14 on the second fixed support stud 23 would not necessarily be in the same positions as the lobes 14 on the first fixed support stud 10.

The two fixed support studs 10 and 23 may be staggered on the support plates 11 and 24 as shown and described in the aforesaid Brooks et al patent, if desired.

However, staggering of the two fixed support studs 10 and 23 is not necessary for satisfactory operation in the present invention.

Figure 3:
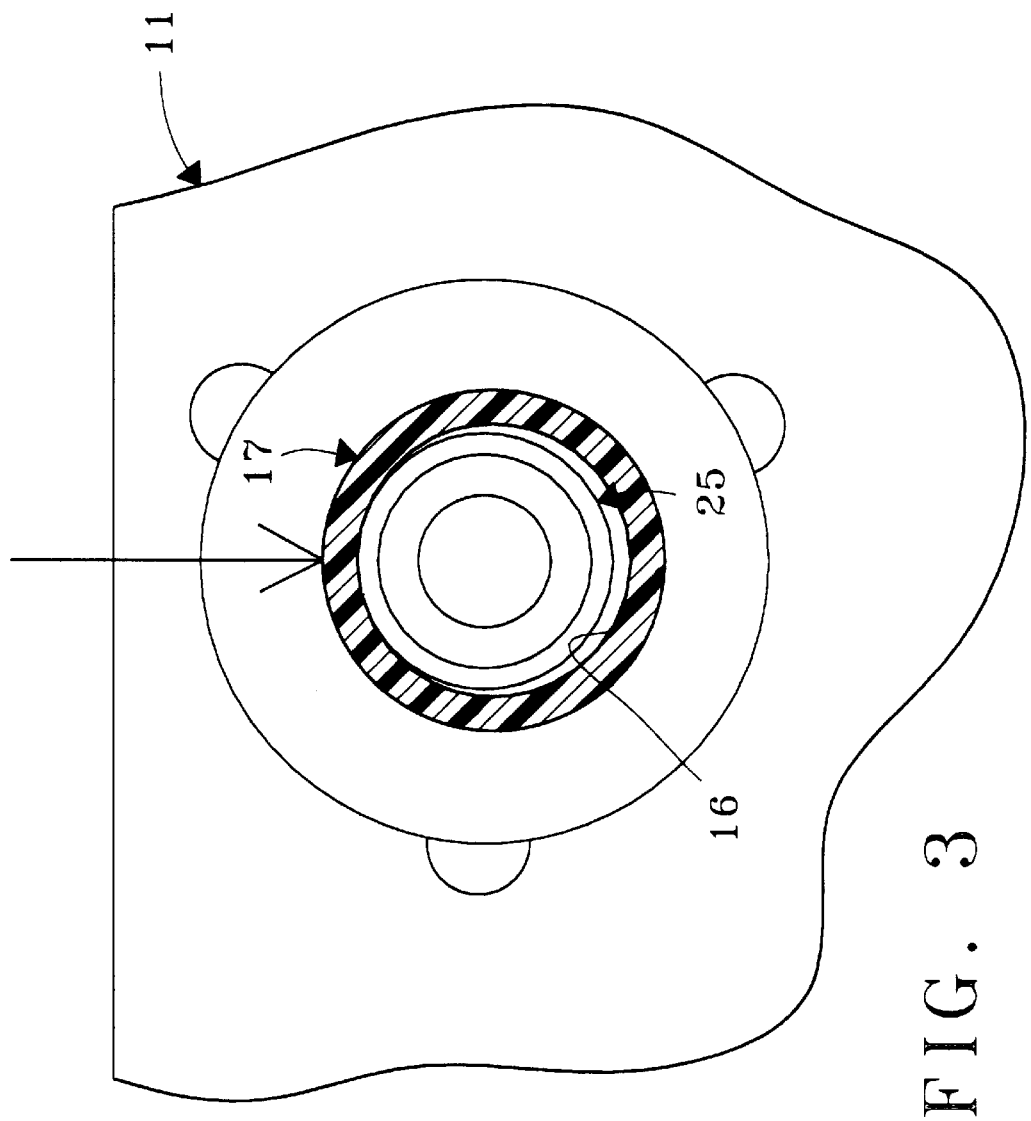
FIG. 3 is an end elevation view, partly in section, showing the prior relation between the one fixed support stud of FIG. 1 and the hub of the plastic gear having a clearance therebetween and taken along line 3—3 of FIG. 2.

FIG. 3 illustrates a fixed support stud 25 in which there is a nominal clearance between the inner surface 16 of the gear hub 17 and the circumference of the fixed support stud 25 in the manner shown and described in the aforesaid Brooks et al patent. When there is staggering, the fixed support stud 25 is disposed with a clearance decreasing from the six o'clock position to the twelve o'clock position as shown in FIG. 3.

Figure 4:
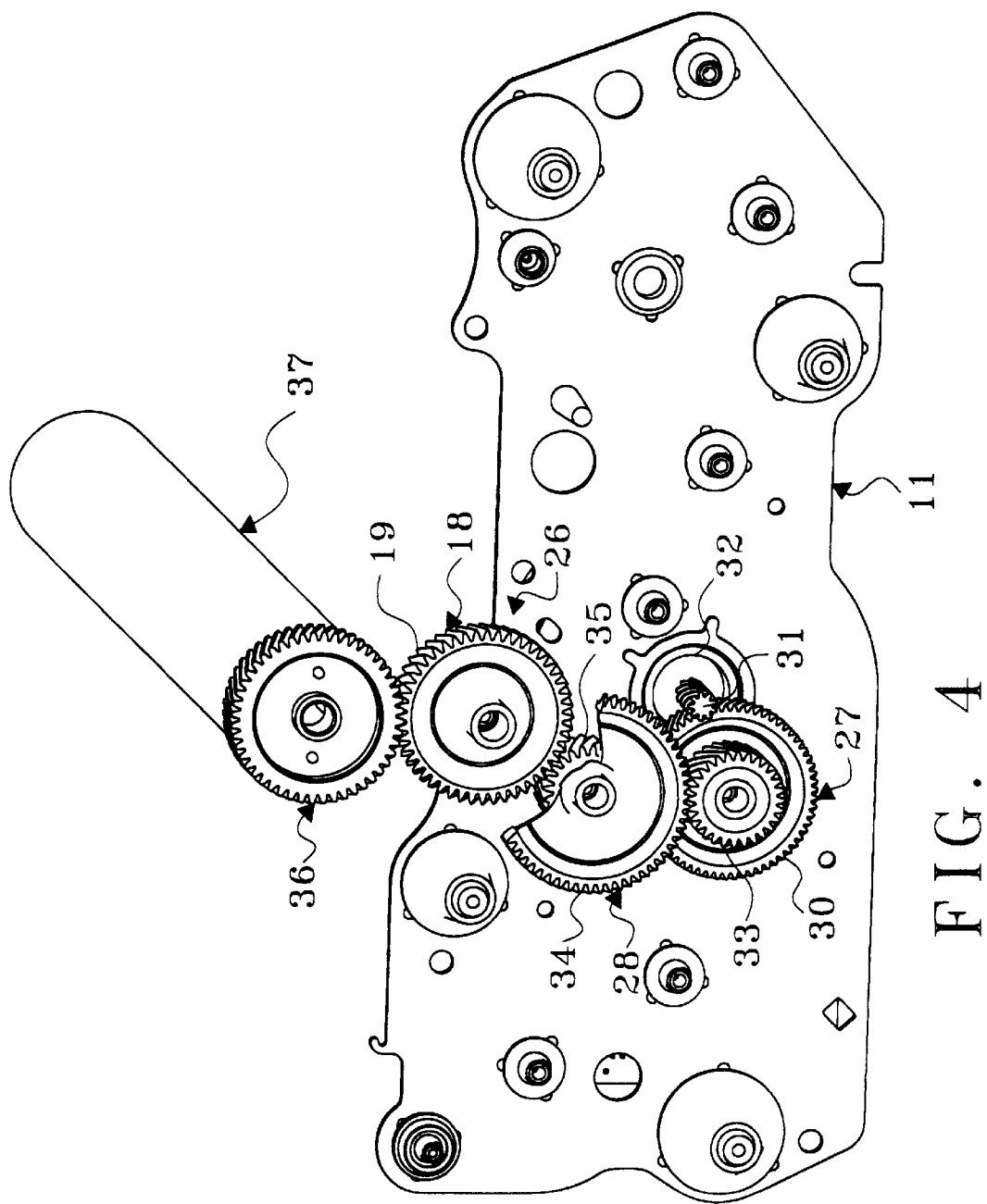
FIG. 4 is a perspective view of a gear train supported on one of the two metal support plates of FIG. 2 with the output gear of the gear train driving a photoconductive drum of a laser printer.

The plastic gear 18 (see FIG. 4) is part of a gear train 26 including plastic compound gears 27 and 28. The compound gear 27 includes a first gear 30 driven by a metal shaft 31 of a motor 32, which is supported by the support plate 11.

The compound gear 27 includes a second gear 33 driving the compound gear 28 through engagement with a first gear 34 of the compound gear 28. The compound gear 28 has a second gear 35 engaging the plastic gear 18 to rotate it. The plastic gear 18, which is the output gear of the gear train 26, drives a plastic gear 36, which is connected to a photoconductive drum 37 of a laser printer.

It is only necessary that the plastic gear 18 utilize the gear arrangement of the present invention to improve the print quality produced by the photoconductive drum 37. This is because the gear arrangement of the compound gear 27 or 28 would not have a sufficient effect on the print quality produced by the photoconductive drum 37 of the laser printer. However, it should be understood that the gear arrangement could be utilized with more than one gear of a gear train when necessary.

One of the lobes 14 (see FIG. 1) on the first fixed support stud 10 is aligned with a first gear reaction force, identified by an arrow 38, created by the gears 35 (see FIG. 4) and 36 meshing with the plastic gear 18. In FIG. 1, this is the lobe 14 on the first fixed support stud 10 at the twelve o'clock position.

The gears 35 (see FIG. 4) and 36 create a second gear reaction force, identified by an arrow 39 (see FIG. 5), on the lobe 14 on the second fixed support stud 23 at the four o'clock position. Therefore, each of the first fixed support stud 10 (see FIG. 2) and the second fixed support stud 23 has a different gear reaction force acting thereon.

Figure 6:
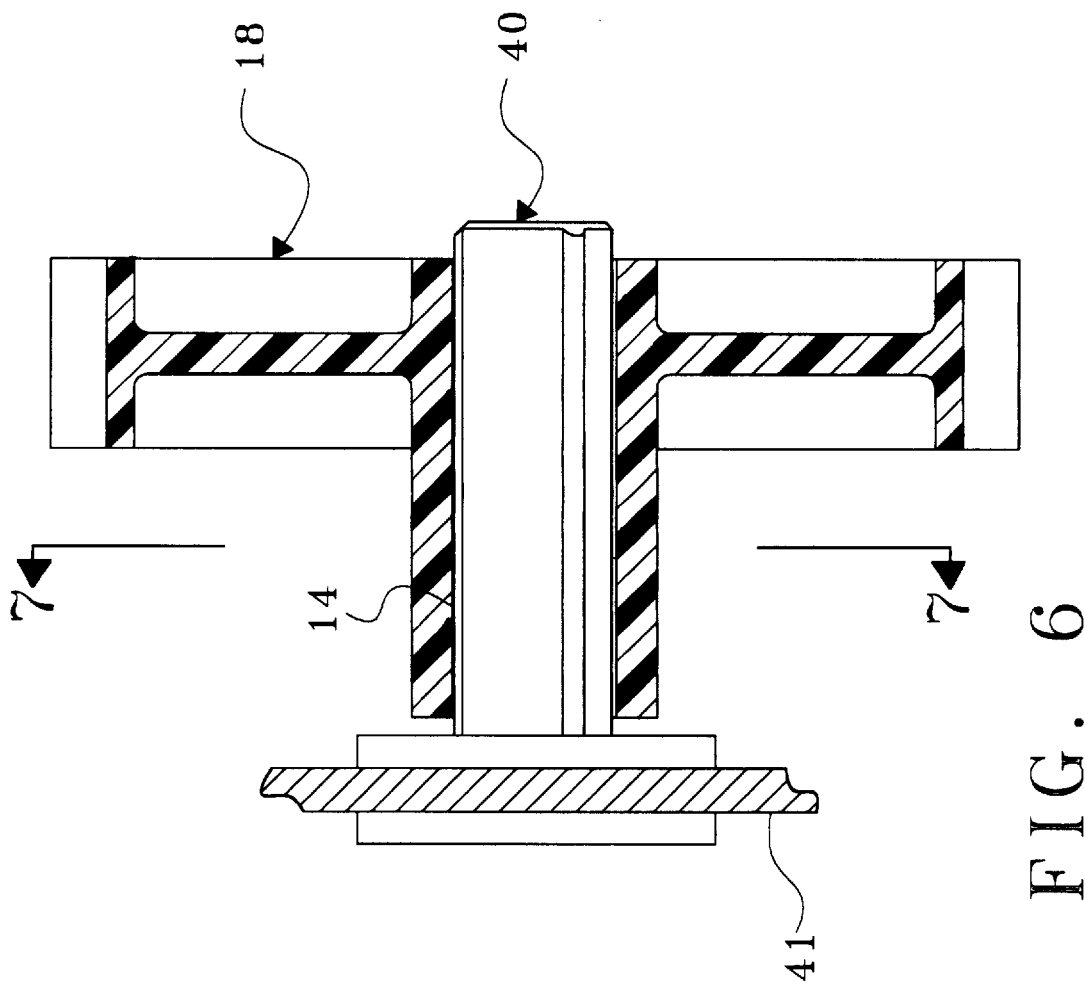
FIG. 6 is a sectional view, partly in elevation, of the plastic gear supported on a single fixed support stud.

While the two fixed support studs 10 and 23 have been shown as supporting the gear hub 17, it should be understood that only one fixed support stud 40 (see FIG. 6) may be employed, if desired. The fixed support stud 40 would be supported from a metal support plate 41 in the same manner as the fixed support studs 10 (see FIG. 2) and 23 are supported by the metal support plates 11 and 24, respectively.

Figure 7:
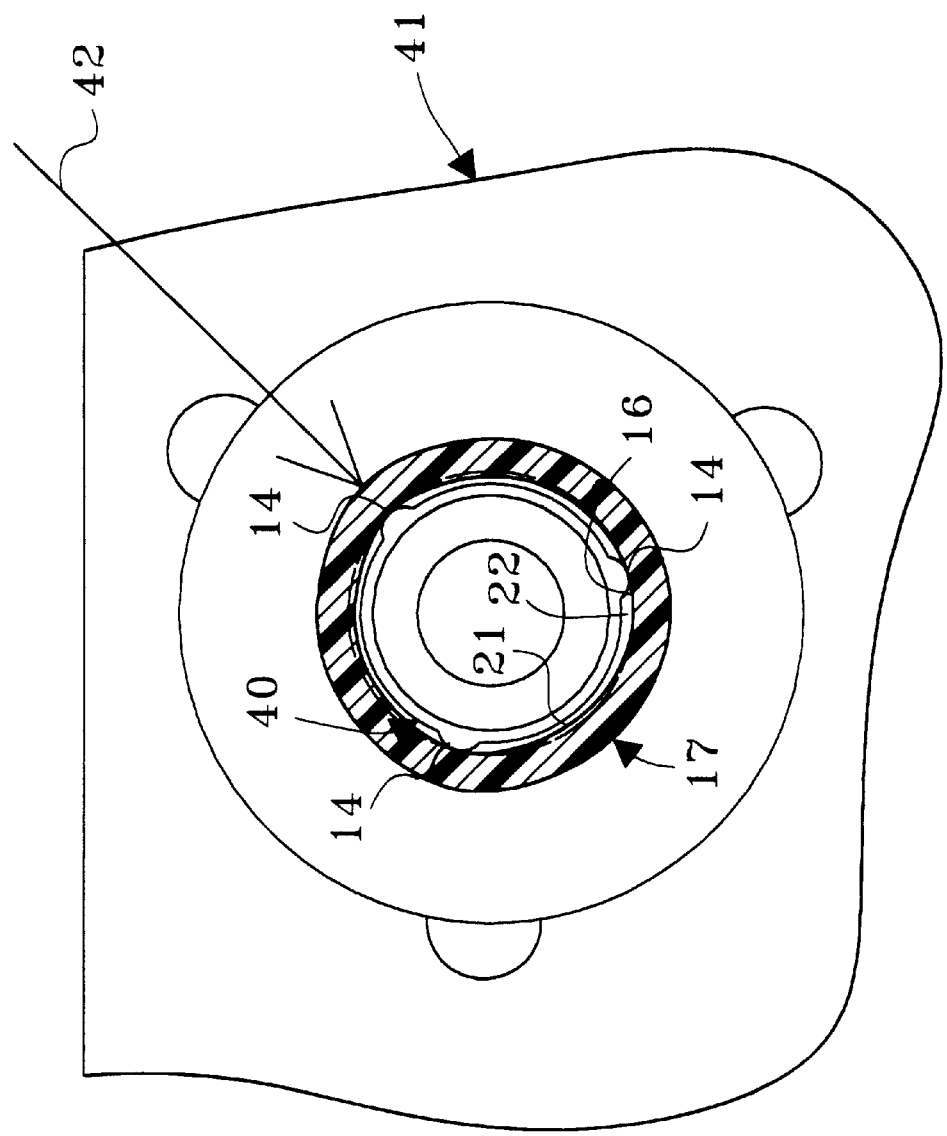
FIG. 7 is an end elevation view, partly in section, of the single fixed support stud and the hub of the plastic gear rotatably supported on the single fixed support stud with the single fixed support stud having three lobes for engaging an inner surface of the gear hub to cause deformation of the gear hub with the deformation exaggerated for clarity purposes and taken along line 7—7 of FIG. 6.

As shown in FIG. 7, one of the lobes 14 on the fixed support stud 40 is aligned with a gear reaction force, identified by an arrow 42, created by the gears 35 (see FIG. 4) and 36 meshing with the plastic gear 18. In FIG. 7, this is the lobe 14 at the two o'clock position.

While the plastic gear 18 (see FIG. 4) has been shown as the output gear of the gear train 26, it should be understood that the present invention may be utilized with the plastic gear 18 being the only gear between the shaft 31 of the motor 32 and the gear 36. Each of the gears of the gear train 26 is preferably an acetal resin sold under the trademark DEL-RIN.

The fixed support studs 10, 23, (see FIG. 2) and 40 (see FIG. 6) are formed of molded plastic, which is preferably the plastic described in the aforesaid Brooks et al patent and sold by LNP Engineering Plastics, Inc., Exton, Pa. under the trade name Lubricomp RFL 4536. The RFL 4536 is described by the manufacturer as by weight 55 percent Nylon, 30 percent glass fibers, 13 percent polytetrafluoroethylene and 2 percent silicone. When the gear 18, which is acetal resin, rotates on studs 10 and 23 or 40 of the RFL 4536, it is the gear 18 which experiences wear, not studs 10 and 23 or 40 Contact is between lobes 14 and inner surface 16 of the gear 18. The friction of lobes 14 at surface 16 remains adequately low during use.

While one of the lobes 14 (see FIG. 1) on each of the first fixed support stud 10, the second fixed support stud 23 (see FIG. 5), and the fixed support stud 40 (see FIG. 7) has been shown aligned with the gear reaction force, identified by the arrows 38 (see FIG. 1), 39 (see FIG. 5), and 42 (see FIG. 7), respectively, it should be understood that the lobe 14 could be shifted a maximum of 20 degrees to either side of the gear reaction force, identified by the arrows 38 (see FIG. 1), 39 (see FIG. 5), and 42 (see FIG. 7), respectively, and still obtain some reduction of gear vibration or jitter. Therefore, as used in the claims, "substantially aligned" includes any alignment up to the maximum of 20 degrees on each side of the gear reaction force.

It should be understood that the gear reaction forces on one of the lobes 14 on the two fixed supports studs 10 (see FIG. 2) and 23 would not have to be aligned at the same angle to the reaction gear force. Thus, one of the lobes 14 on one of the two fixed supports studs 10 (see FIG. 2) and 23 could be aligned with the gear reaction force and one of the lobes 14 on the other of the two fixed supports studs 10 (see FIG. 2) and 23 could be shifted to either side of the gear reaction force up to the maximum of 20 degrees. Likewise, the amount of shifting could be different for the two fixed support studs 10 and 23.

However, the most satisfactory and effective position of the lobes 14 on the first fixed support stud 10 is shown in FIG. 1 in which one of the three lobes 14 is aligned with the gear reaction force, identified by the arrow 38. Likewise, the most satisfactory and effective position of the lobes 14 on the second fixed support stud 23 (see FIG. 5) is with one of the lobes 14 aligned with the gear reaction force, as shown in FIG. 5. Similarly, the most satisfactory and effective position of the lobes 14 on the fixed support stud 40 (see FIG. 7) is with one of the lobes 14 aligned with the gear reaction force, as shown in FIG. 7.

If desired, more than three of the lobes 14 (see FIG. 1) may be employed. However, this would not be as satisfactory as the use of the three lobes 14. This increased number of the lobes 14 greater than three also would increase the binding load between the gear hub 17 and the lobes 14 so as to unnecessarily increase the binding load.

An advantage of this invention is that the print quality of a printer, particularly a laser printer, is improved. Another advantage of this invention is that the vibration or jitter of a gear is decreased.

For purposes of exemplification, preferred embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A gear arrangement including:
    a plastic gear including a hub having a bore extending therethrough, said hub having a surface defining said bore, said plastic gear having gear teeth on at least a portion of its length;
    at least one fixed support stud for disposition within said bore in said hub for rotatably supporting said plastic gear;
    said fixed support stud having at least three angularly spaced lobes on its circumference of a diameter sufficient to engage the surface of said hub defining said bore to reduce the minimum nominal clearance between said fixed support stud and the surface of said bore to substantially zero, each of said lobes extending the length of said fixed support stud;
    and one of said lobes on said at least one fixed support stud being substantially aligned with a gear reaction force acting on said hub of said plastic gear.

2. The gear arrangement according to claim 1 including two fixed support studs;
    and said bore in said hub receiving one of said two fixed support studs at each of its ends.

3. The gear arrangement according to claim 2 in which:
    one of said lobes on one of said two fixed support studs is aligned with a first gear reaction force acting on said hub of said plastic gear;
    and one of said lobes on the other of said two fixed support studs is aligned with a second gear reaction force acting on said hub of said plastic gear.

4. The gear arrangement according to claim 3 in which each of said fixed support studs is plastic.

5. The gear arrangement according to claim 4 in which said plastic gear is the output gear of a gear train.

6. The gear arrangement according to claim 3 in which said plastic gear is the output gear of a gear train.

7. The gear arrangement according to claim 2 in which said plastic gear is the output gear of a gear train.

8. The gear arrangement according to claim 2 in which said lobes on each of said two fixed support studs are equiangularly spaced from each other.

9. The gear arrangement according to claim 1 in which said lobes on said at least one fixed support stud are equiangularly spaced from each other.

10. The gear arrangement according to claim 1 in which one of said lobes on said at least one fixed support stud is aligned with the gear reaction force acting on said hub of said plastic gear.

11. A gear support arrangement including:
    at least one fixed metal support plate;
    at least one fixed support stud supported on said support plate;
    a plastic gear including a hub having a bore extending therethrough, said hub having a surface defining said bore, said plastic gear having gear teeth on at least a portion of its length, said bore receiving said at least one fixed support stud to enable said at least one fixed support stud to rotatably support said gear;
    said at least one fixed plastic support stud having at least three angularly spaced lobes on its circumference of a diameter sufficient to engage the surface of said hub defining said bore to reduce the minimum nominal clearance between said fixed support stud and the surface of said bore to substantially zero, each of said lobes extending the length of said fixed support stud;
    and one of said lobes on said at least one fixed support stud being substantially aligned with a gear reaction force acting on said hub of said plastic gear.

12. The gear support arrangement according to claim 11 including:
    two substantially parallel metal support plates;
    each of said support plates having a fixed support stud thereon;
    and said bore in said hub receiving said fixed support stud on one of said support plates at one of its ends and said fixed support stud on the other of said support plates at the other of its ends to rotatably support said plastic gear between said two support plates.

13. The gear support arrangement according to claim 12 in which:

one of said lobes on one of said fixed support studs is aligned with a first gear reaction force acting on said hub of said plastic gear;

and one of said lobes on the other of said fixed support studs is aligned with a second gear reaction force acting on said hub of said plastic gear.

14. The gear support arrangement according to claim 13 in which each of said fixed support studs is plastic.

15. The gear support arrangement according to claim 14 in which said plastic gear is the output gear of a gear train.

16. The gear support arrangement according to claim 13 in which said plastic gear is the output gear of a gear train.

17. The gear support arrangement according to claim 12 in which said plastic gear is the output gear of a gear train.

18. The gear support arrangement according to claim 12 in which said lobes on each of said two fixed support studs are equiangularly spaced from each other.

19. The gear support arrangement according to claim 11 in which said lobes on said at least one fixed support stud are equiangularly spaced from each other.

20. The gear support arrangement according to claim 11 in which said one lobe on said at least one fixed support stud is aligned with the gear reaction force acting on said hub of said plastic gear.

* * * * *

UNITED STATES PATENT AND TRADEMARK OFFICE
CERTIFICATE OF CORRECTION

PATENT NO : 6,076,419
DATED : June 20, 2000
INVENTOR(S) : Daniel George Mlejnek, et al.

It is certified that error appears in the above-identified patent and that said Letters Patent are hereby corrected as shown below:

Claim 11, column 6, line 50

Delete "plastic".

Signed and Sealed this

Third Day of April, 2001

Attest:

NICHOLAS P. GODICI

*Attesting Officer*     *Acting Director of the United States Patent and Trademark Office*